(12) United States Patent
Li

(10) Patent No.: US 6,884,971 B2
(45) Date of Patent: Apr. 26, 2005

(54) SLOW COOKER WITH DUAL HEATING ELEMENTS

(76) Inventor: George T. C. Li, 2533 N. Carson St., Suite #0 98, Carson City, NV (US) 89706

(*) Notice: Subject to any disclaimer, the term of this patent is extended or adjusted under 35 U.S.C. 154(b) by 0 days.

(21) Appl. No.: 10/340,038

(22) Filed: Jan. 10, 2003

(65) Prior Publication Data

US 2004/0159649 A1 Aug. 19, 2004

(51) Int. Cl.[7] .................. A47J 37/06; A47J 27/022; H05B 3/08
(52) U.S. Cl. ............... 219/436; 219/386; 219/402; 219/541
(58) Field of Search ................ 219/436, 386, 219/402, 432, 433, 429, 535, 536, 541, 542, 546

(56) References Cited

U.S. PATENT DOCUMENTS

| | | | |
|---|---|---|---|
| 2,187,888 A | 1/1940 | Nacumsohn | 219/35 |
| 2,265,295 A | 12/1941 | Layton | 219/41 |
| 2,292,854 A | 8/1942 | Wilcox | 219/44 |
| 3,393,295 A * | 7/1968 | Jepson et al. | 219/386 |
| 6,170,388 B1 | 1/2001 | Shovick | 99/331 |
| 6,274,847 B1 * | 8/2001 | Hlava et al. | 219/433 |

* cited by examiner

Primary Examiner—Joseph Pelham
(74) Attorney, Agent, or Firm—Clifford F. Rey

(57) ABSTRACT

A low wattage slow cooker featuring a wrap-around heating element for heating the side walls of the cooking vessel and a top heating element for browning food items is disclosed. The top browning element is integrated into a lid assembly of the cooker and is provided with quick connect/disconnect electrical connectors, which provide for convenient removal of the lid assembly for food service, cleaning, and storage. The wrap-around heating element and the top heating element are interconnected by a controller for heat regulation and selectively energizing the desired heating elements individually or in combination. The wrap-around heating element and the top heating elements are constructed in alternative embodiments utilizing different configurations of resistance wiring for versatility in manufacturing and cooking applications. All embodiments of the present slow cooker are provided with a heatproof ceramic or glass cooking liner, which acts as an heat insulator.

31 Claims, 18 Drawing Sheets

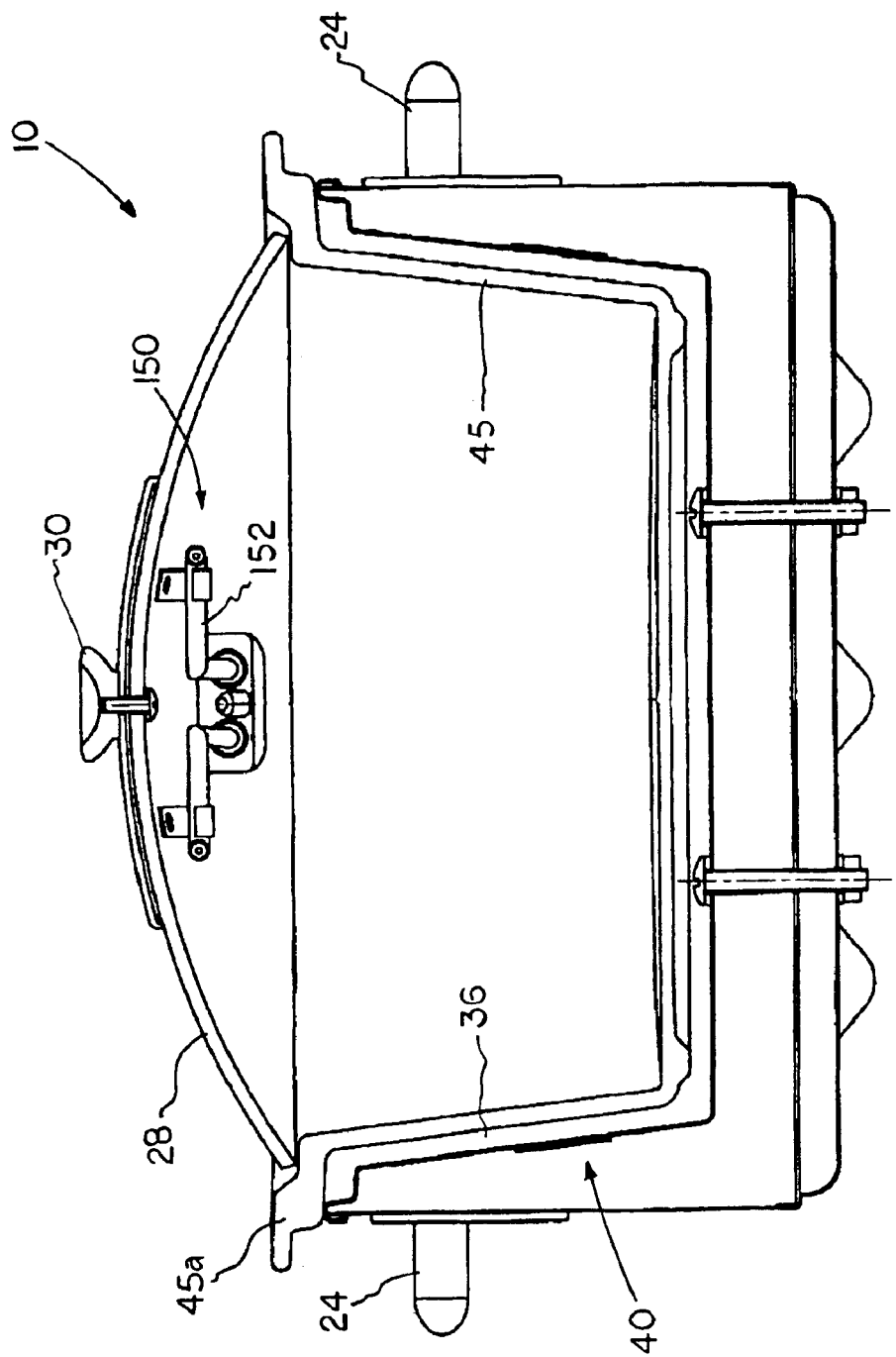

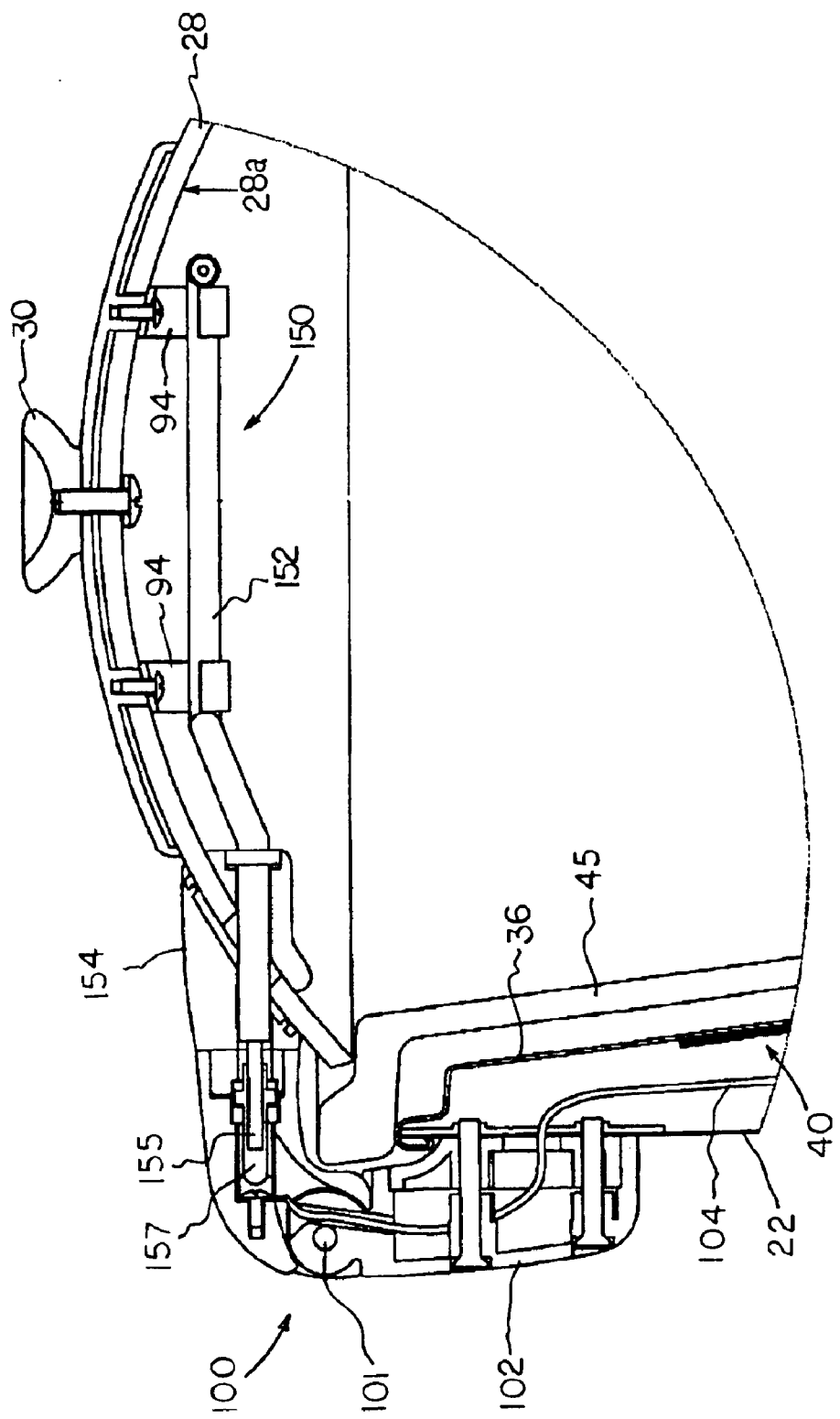

| Item# | 1 | 2 |
|---|---|---|
| Side band heater | 250W | 250W |
| Tob Browner | -- | 100W |
| Tob Browner Shape | -- | Rectangular |
| Crock-pot, liters | 6.6 | 6.6 |
| Electric Properties: | | |
| -Dielectric Resistance | OK | OK |
| -Leak Current, ma | 0.028 | 0.028 |
| -High Pot | OK | OK |
| Interior Temperature, C | | |
| 1" from bottom | 138 | 150 |
| 2" from bottom | 135 | 145 |
| 3" from bottom | 133 | 143 |
| 4" from bottom | 128 | 140 |
| Exterior Temperature, C | | |
| Lid knob | 60 | 64 |
| Lid surface | 65 | 112 |
| Side handles | 48 | 50 |
| Strain Relief | 47 | 50 |
| Bottom | 61 | 60 |
| Controller knob | 31 | 32 |
| Casing exterior | 118 | 130 |
| Room Temp | 25 | 25 |
| Cooking Test( whole chicken): | | |
| Skin color after 1 Hr. | Water Condensate on glass lid | Natural color |
| After 2 Hrs. | Natural color | Oil on bottom |
| After 3 Hrs. | Oil on bottom | Turn slight yellow |
| After 4 Hrs. | More oil accum. | Golden brown |
| After 5 Hrs. | Light yellow-legs | Brown |
| After 6 Hrs. | L Yellow-sides | Skin-crispy |
| After 7 Hrs. | L-yellow-sides | Darker brown |
| After 8 Hrs. | L-yellow-sides | Darker brown |
| Remarks: | | |
| Chicken Weight, Kg | 0.7 | 0.7 |

FIG. 9

SLOW COOKER WITH DUAL HEATING ELEMENTS

BACKGROUND OF INVENTION

The present invention relates to cooking appliances and, more particularly, to a slow cooker having a side heating element for applying heat to the cooking vessel and a top heating element for browning.

Slow cooking pots or so-called slow cookers for preparing and serving hot foods are known in the art. For example, a slow cooker of the type wherein food items are cooked slowly at low temperature over an extended period of time is a common kitchen appliance. Such prior art slow cookers typically include a heating element arranged in functional relation to the lower portion of the cooking vessel to supply heat for cooking.

However, applying heat only to the bottom and/or lower sidewalls of such a slow cooker can result in the upper portion of the cooking vessel being insufficiently heated. Thus, the food items in the upper portion of the cooking vessel often appear inadequately cooked and lack visual appeal to the consumer due to the slow rate at which heat is supplied to the upper portion of the cooking vessel.

Accordingly, the present invention has been developed to resolve this problem and other shortcomings of the prior art.

DESCRIPTION OF THE PRIOR ART

One example of a prior art deep well cooker is disclosed in U.S. Pat. No. 2,265,295 to Layton comprising a roaster with a housing and cooking well with a peripheral heater. However, Layton does not explicitly suggest any control means allowing various cooking modes or other novel features of the present invention.

German patent document 3606800 to Rederer discloses a lid heater supplementing a cooking vessel to permit different heating modes. This appliance has a bottom cooker part which can be connected to a power supply and which can be heated by a first heating device. The lid portion of this device is electrically connected to the bottom cooker and utilizes a separate top heating element with a second set of controls. However, this device also lacks the novel features and technical advantages of the present slow cooker.

U.S. Pat. No. 6,170,388 to Shovick discloses a cooking device including a bottom heating member having at least one heating element within a lower housing; a top heating member within an upper housing having at least one heating element therein; and further includes vertical support members for supporting the top heating member above the bottom heating member in spaced apart relation. This cooking device is designed for use with a frying pan, which is inserted between the top and bottom heating members, to cook both sides of the food item simultaneously, and is not a deep well, slow cooker in the manner of the present invention.

U.S. Pat. No. 2,292,854 to Wilcox and U.S. Pat. No. 2,187,888 to Nachumsohn disclose techniques for the construction of heating elements using electric heating wire, which is wrapped around a mica strip with notches and sandwiched between insulating layers. The heating elements are secured about the cooking vessel using an adjustable clamp and fastened thereto by riveting.

While these cooking devices perform adequately for their intended purposes, they do not, when taken alone or in combination, provide the features or technical advantages of the present invention.

SUMMARY OF THE INVENTION

Accordingly, the present invention provides a low wattage, slow cooker that includes a wrap-around heating element, which is disposed about the heating well for side wall heating and a top heating element for browning (i.e. to scorch slightly in cooking) which is integrated within the cooker lid. Advantageously, the lid of the present slow cooker, which contains the top browning element, is provided with quick connect/disconnect electrical and/or magnetic connectors, which form a portion of the electrical circuit for the top browning element. All embodiments of the present slow cooker are provided with a heatproof ceramic or glass cooking liner, which acts as a heat insulator in conjunction with the low wattage and temperatures of the cooker.

In the present invention the wrap-around heating element and the top heating elements are constructed in alternative embodiments utilizing different types of resistance wiring for versatility in manufacturing and cooking applications. The wrap-around heating element and the top heating element are interconnected by a controller for heat regulation and for selectively energizing the desired heating elements individually or in combination.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

FIG. 2A is a longitudinal cross-section of the slow cooker showing details of the construction thereof;

FIG. 8A is a partial cross-section view of the slow cooker showing the lid assembly including the hinge mechanism with the quick connect/disconnect plug connectors;

FIG. 9 depicts comparative test results of a prior art cooker versus the present slow cooker in table format.

DETAILED DESCRIPTION OF THE PREFERRED EMBODIMENTS

Figure 1A:
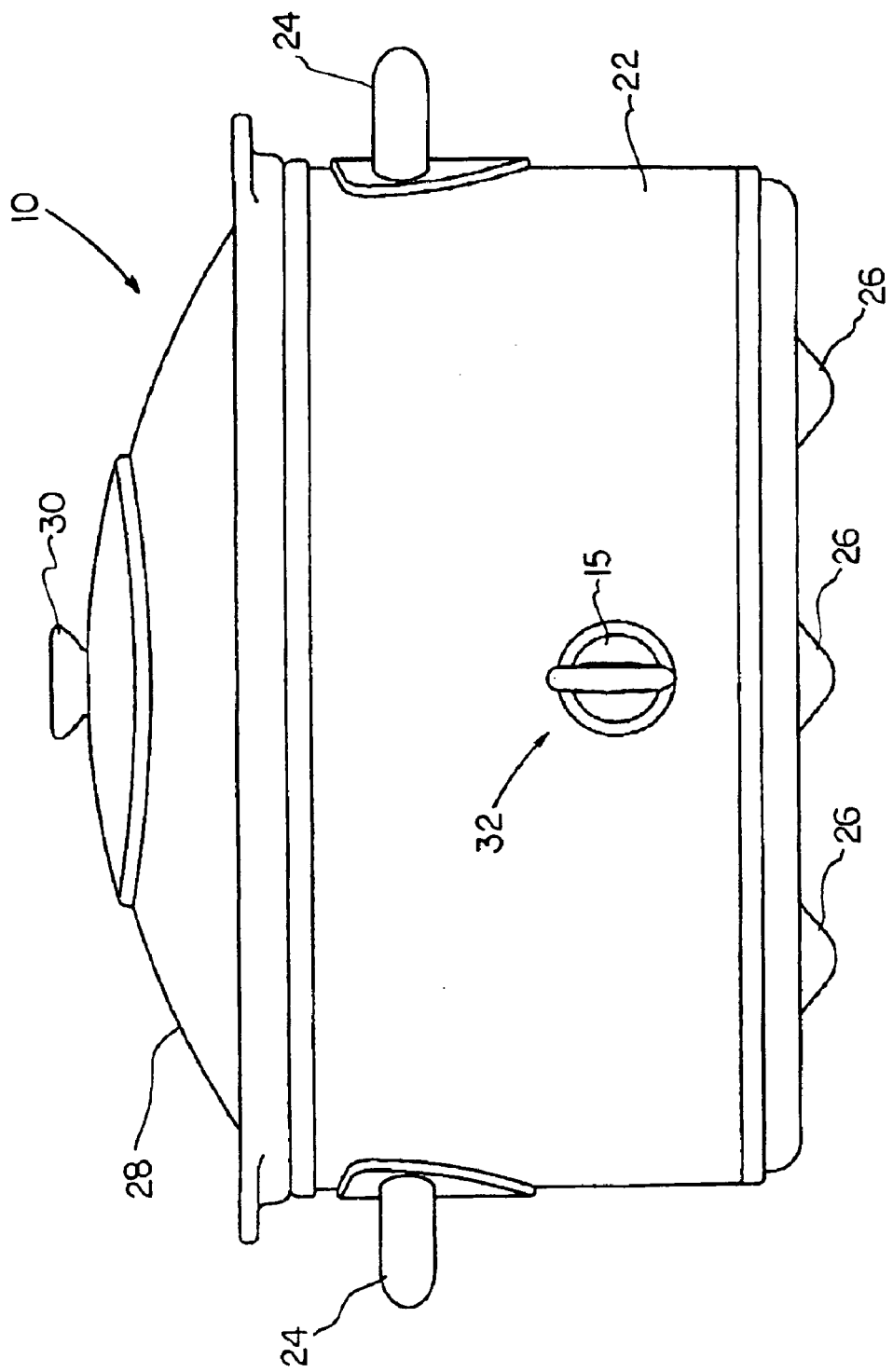
FIG. 1A is a front elevational view of the present slow cooker featuring electromechanical controls.

With further reference to the drawings, there is shown therein an embodiment of a slow cooker in accordance with the present invention, indicated generally at 10, and illustrated in FIG. 1A. The present slow cooker 10 is comprised of an outer housing 22 equipped with fixed external handles 24 and feet 26. The slow cooker 10 is also provided with a lid 28 equipped with a handle 30.

In the preferred embodiment the housing 22 is constructed of sheet steel, heat resistant plastic, or other suitable material and is provided in different exterior finishes such as powder coating, stainless steel, or plated steel.

Figure 2B:
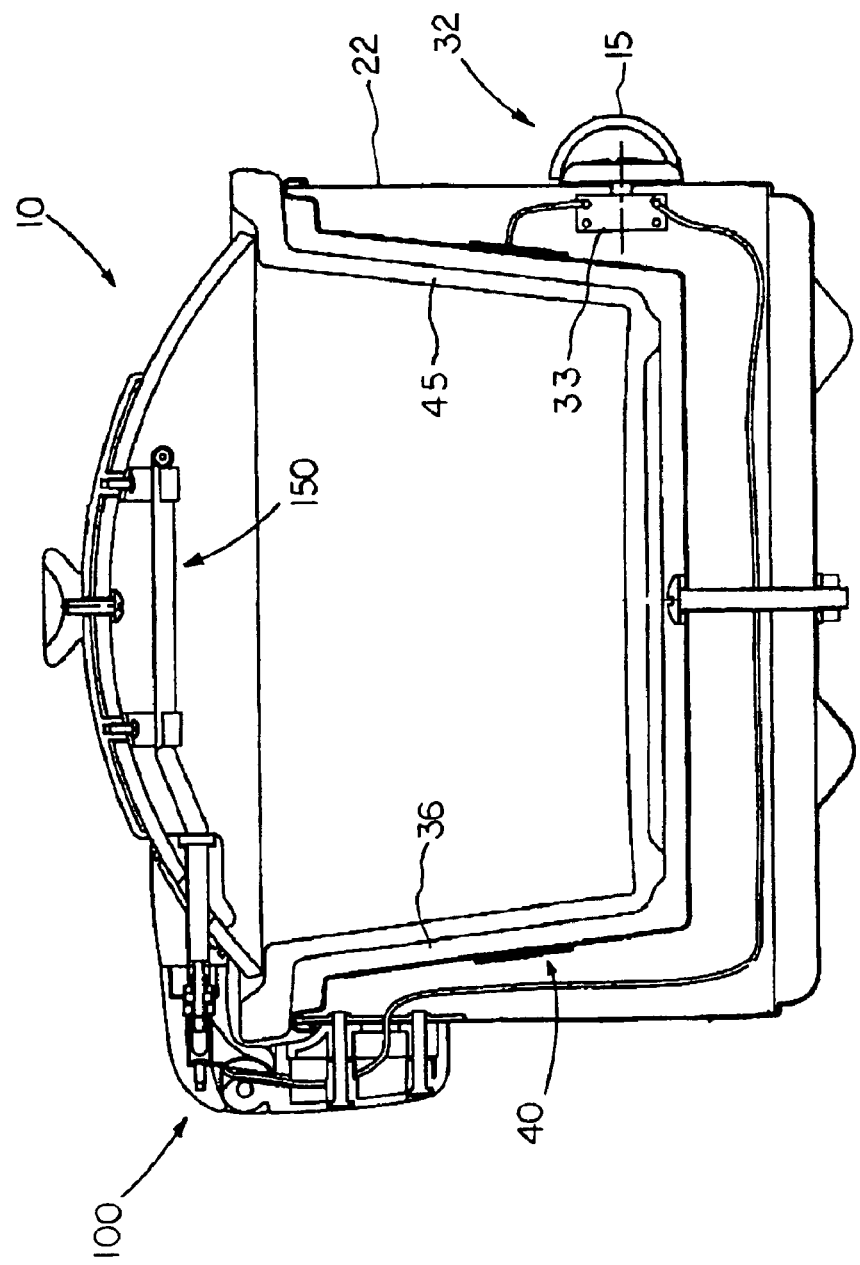
FIG. 2B is a transverse cross-section of the slow cooker showing further details thereof including the hinge mechanism.

The present slow cooker 10 also includes an internal heating well 36 disposed within the housing 22 as more clearly shown in FIGS. 2A and 2B. The heating well 36 is constructed of steel, aluminum, cast iron or other suitable material. Slow cooker 10 also includes a removable cooking liner 45 including a peripheral flange member 45a which is seated on the upper edge of the housing 22 as shown. The liner 45 is fabricated from materials such as ceramic, glass, pottery, or other suitable material, which function as a heat insulator for the low wattage slow cooker 10. The cooking liner 45 is easily removed from the heating well 36 for cleaning purposes.

Figure 1B:
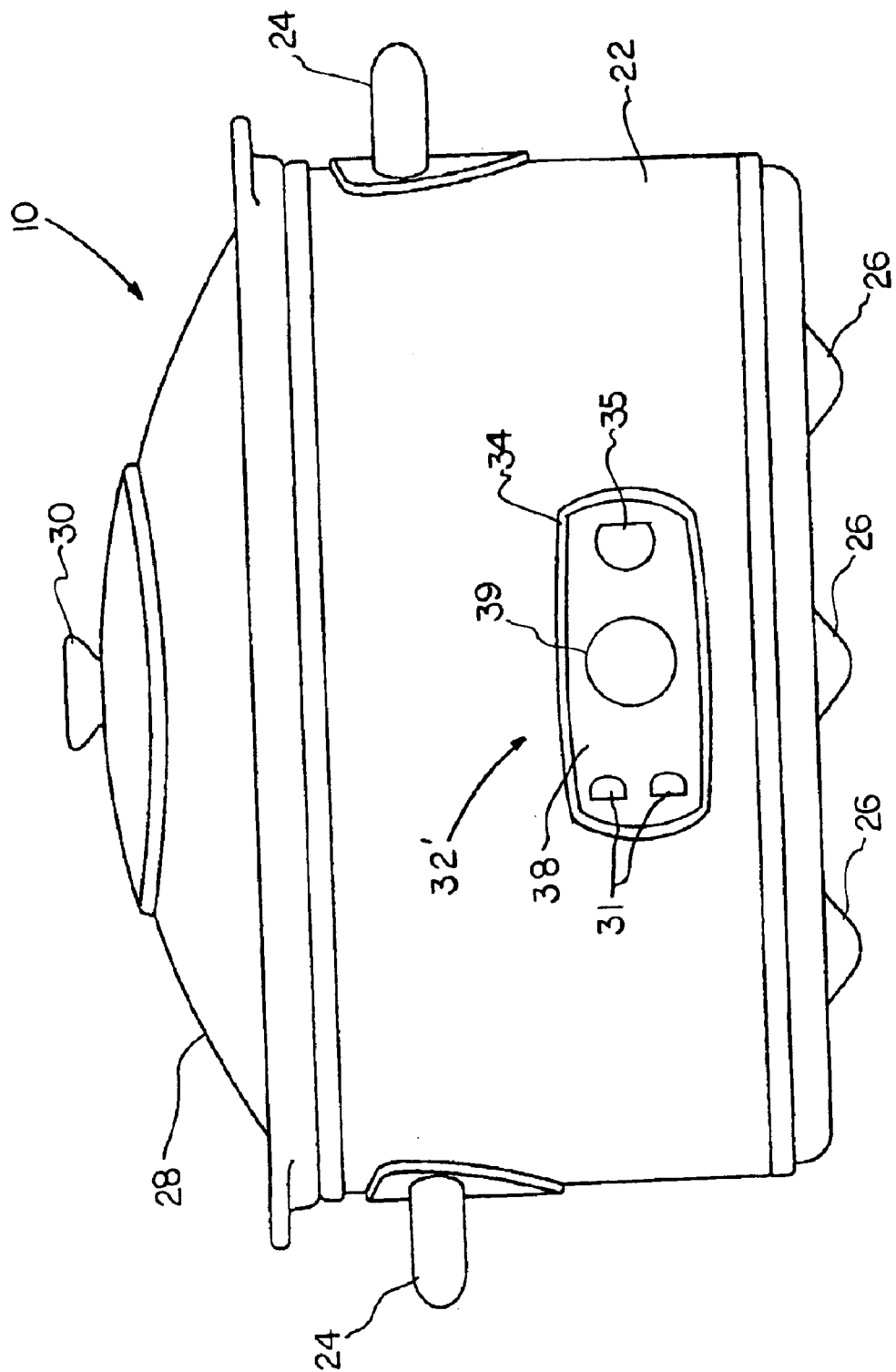
FIG. 1B is a front elevational view of an alternative embodiment of the present slow cooker featuring electronic controls and touch-film user interface.

Referring to FIG. 2B, a heat controller, indicated generally at 32, is provided on the lower front surface of the housing 22 to carry out the functions of the present slow cooker 10. The controller 32 includes a control knob 15 that actuates a multiple position switch 33, which is electrically interconnected by wiring to both the wrap-around heating element 40 and top browning element 150 functioning to regulate the operation thereof It will be appreciated by those skilled in the art that the electrical functions of the present slow cooker 10 may be carried out by the electromechanical switch 33 (FIG. 1A) or, in the alternative, by the use of an electronic control panel, indicated generally at 32', having a touch film interface (FIG. 1B). The control panel 32' includes cooking mode switches 31, top browner ON/OFF switch 35, and power switch 39. In the embodiment shown the control panel 32' is comprised of a heat-resistant housing 34 including a flexible push button film 38 which overlays an electronic control circuit board 37 (FIG. 7B) that provides the user with fingertip control of the cooking functions.

Figure 3:
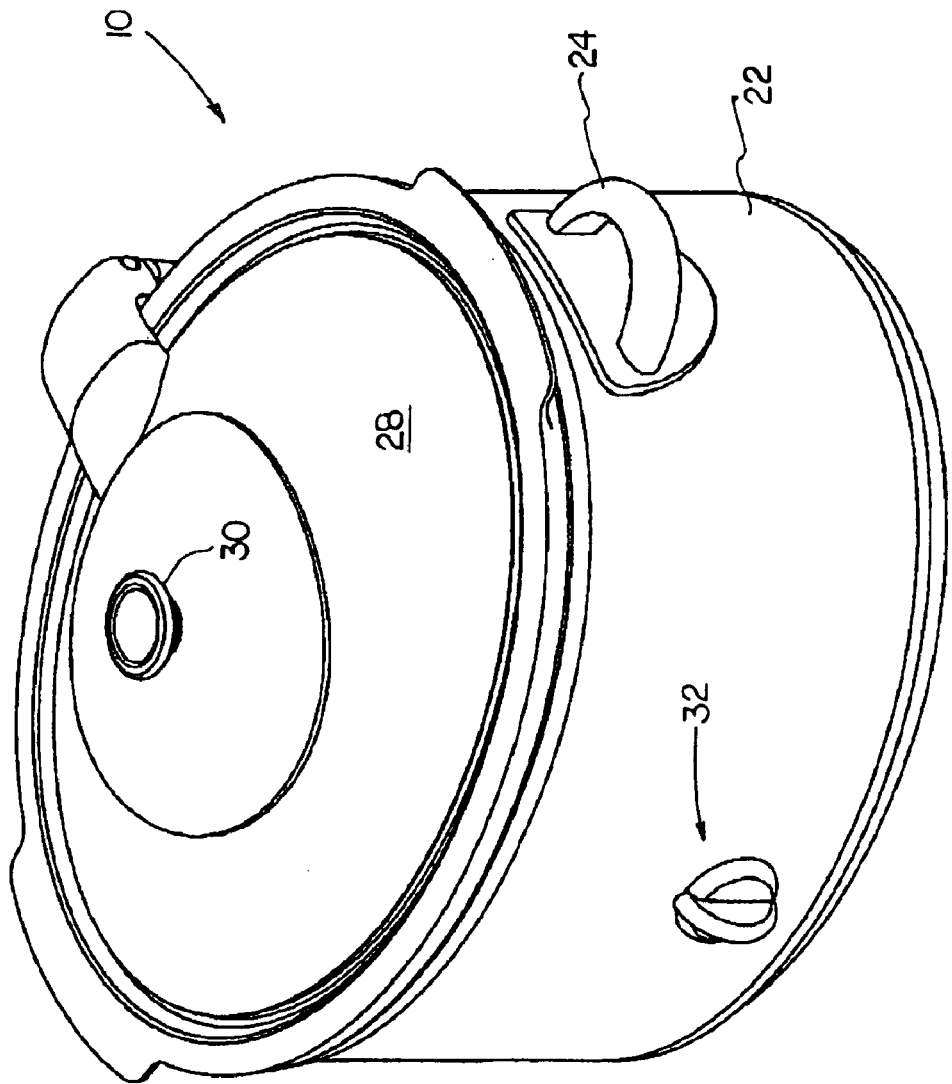
FIG. 3 is a perspective view of an embodiment of the slow cooker of the present invention.

Referring to the embodiment illustrated in FIG. 3, the slow cooker 10 is oval-shaped in configuration. It has been determined that optimal heating of the side wall surfaces of the heating liner 36 can be achieved at all times in the oval configuration. However, it will be appreciated that the slow cooker 10 may be constructed in a circular, square, or rectangular configurations with minor modifications to the heating elements 40 and 150.

Figure 4:
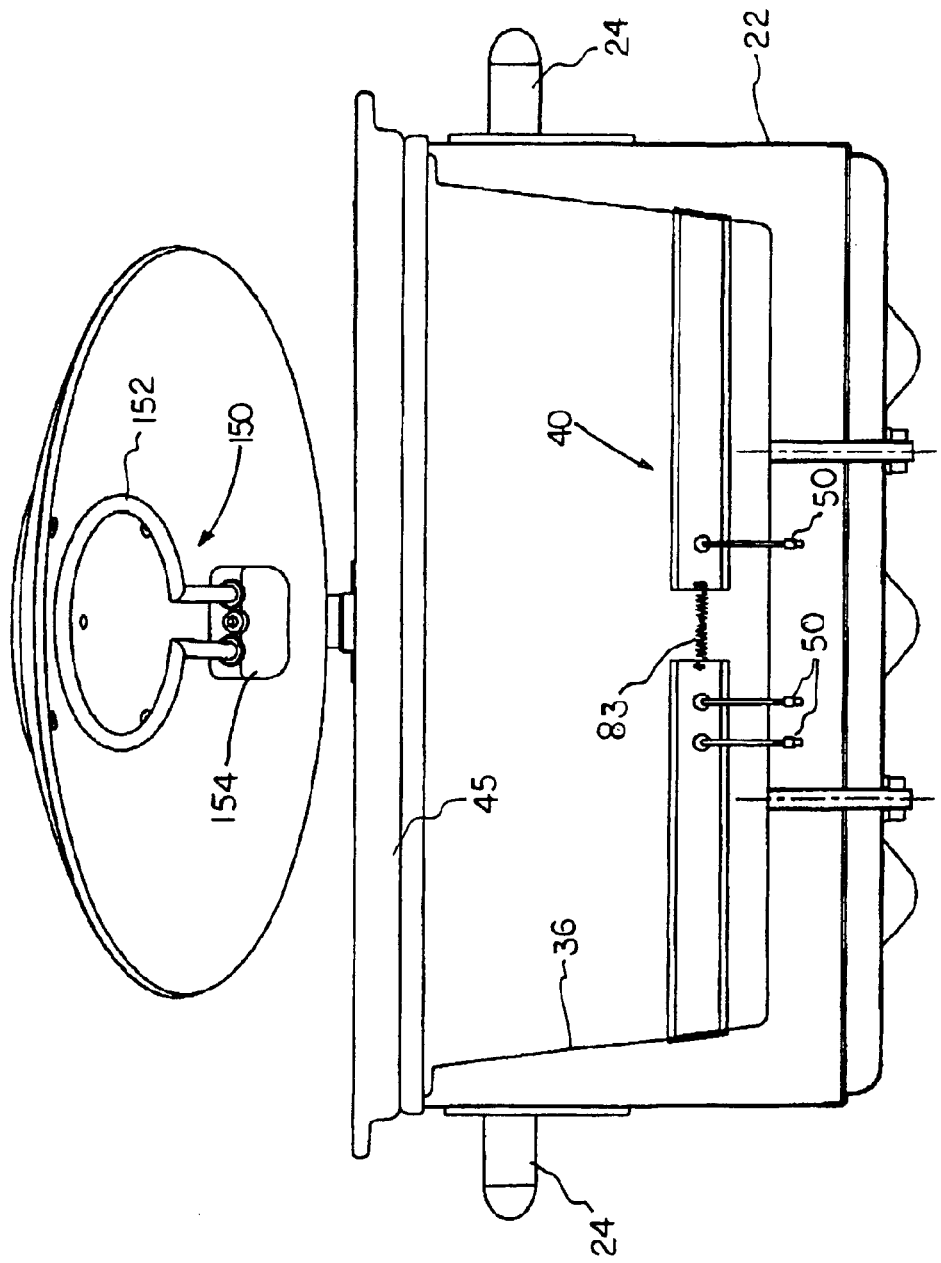
FIG. 4 is a partially cutaway elevational view of the slow cooker showing further details of the wrap-around heating element and the top browning element.

With reference to FIG. 4, the present invention provides structures, which comprise heating means including, but not limited to, the following structures. In the embodiment shown, the slow cooker 10 features a wrap-around heating element, indicated generally at 40, and a top browning element, indicated generally at 150. In one embodiment the wrap-around heating element 40 is constructed as a layered assembly wherein a sheet of heat insulating material, indicated generally at 70, such as mica insulation board is interposed between interior and exterior sheets 72, 74 of similar heat insulating material as illustrated in FIG. 5A.

Since mica insulation board and other similar heat insulating materials are known to those skilled in the art, further detailed discussion of these materials is not deemed necessary.

Figure 5A:
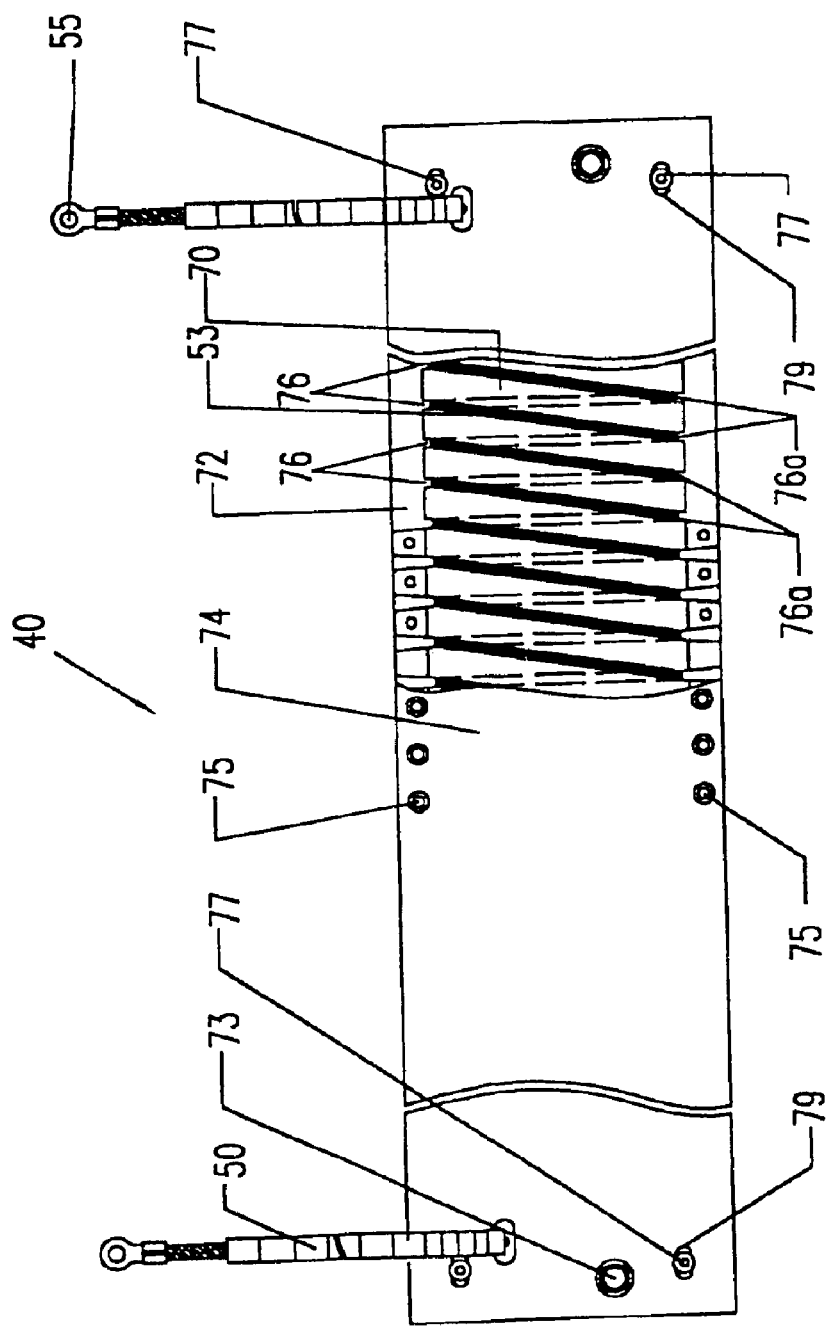
FIG. 5A is a partially cutaway elevational view showing the details of the construction of the heating elements in a double-sided configuration.
Figure 5B:
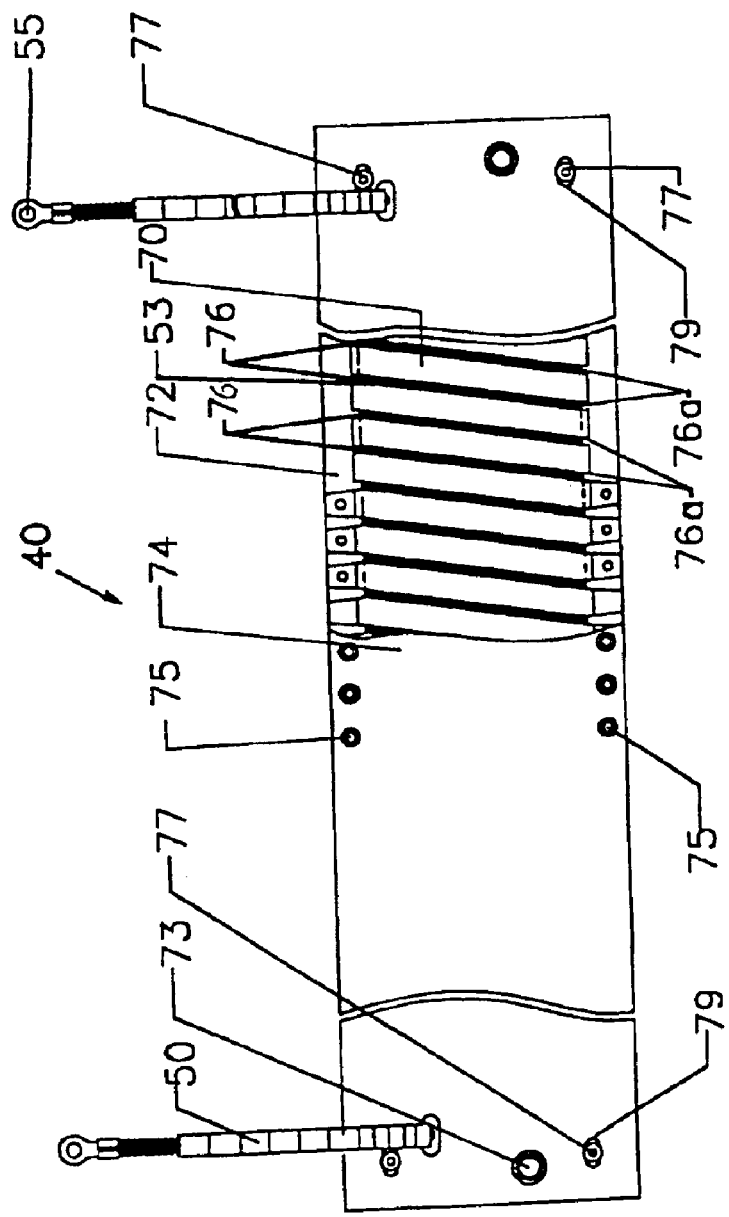
FIG. 5B is a partially cutaway elevational view showing the details of the construction of the heating elements in a single-sided configuration.
Figure 5C:
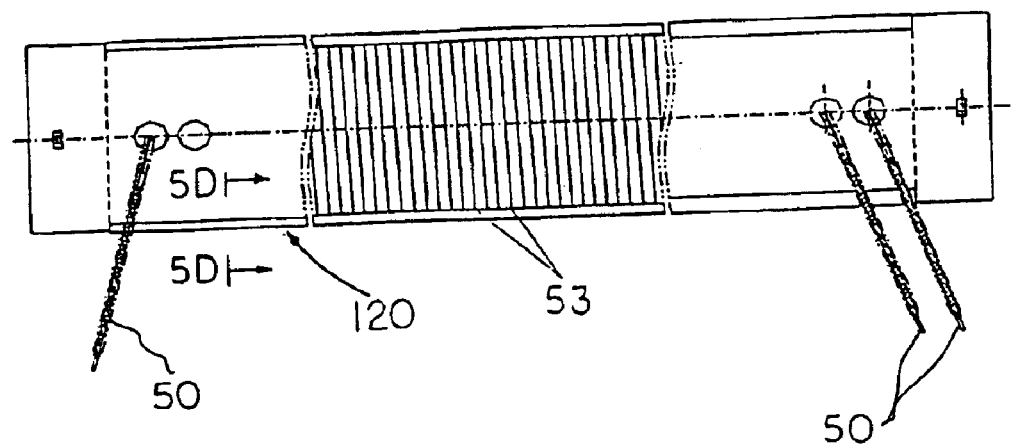
FIG. 5C is a partially cutaway elevational view of an alternative embodiment of the wrap-around heating element.
Figure 5D:
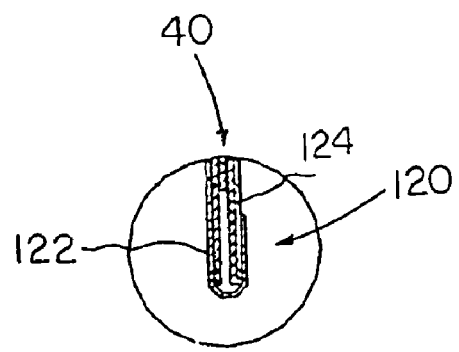
FIG. 5D is a sectional view taken along line 5D—5D of FIG. 5C showing details thereof.

Referring to FIGS. 5A and 5B, it will be noted that the sheet of heat insulating material 70 is fabricated with a plurality of die-cut notches 76 and 76a, which are formed at predetermined intervals along the opposite lateral edges thereof. Using a construction method of the present invention, the heater wire 53 is drawn across a pair of diagonally opposed notches as at 76 and 76a, wrapped in continuous revolutions around the heat insulating sheet 70, and advanced in this manner along the entire length thereof as shown by directional arrows. It will be appreciated that using the aforementioned technique produces a so-called double-sided heating element (FIG. 6A) having heating wire 53 disposed on both sides thereof.

Using an alternative construction technique shown in FIG. 5B, a single-sided heating element can be produced by initially drawing the heater wire 53 across the heat insulating sheet 70 as described in the first step hereinabove. Next, the wire 53 is interlaced between adjacent notches 76 on the same lateral edge of the heat insulating sheet 70 as shown by directional arrows. Thereafter, the wire 53 is again drawn across the sheet 70 to the next diagonally opposed notch 76a on the opposite lateral edge thereof. Next, the wire 53 is interlaced between adjacent notches 76a on the opposite lateral edge of the heat insulating sheet 70.

In this manner, it will be understood that a single-sided heater element having at least 75% of the total amount of heater wire 53 used in its construction disposed on one surface of the sheet 70 may be produced. Such a single-sided heating element (FIG. 5B) is advantageous in reducing the radially outward reflection of heat generated by the heating elements thereby improving heating efficiency and providing a cooler outer surface in the event of user contact for safety purposes.

In both of the above described embodiments, the sheet 70 is permanently captured between the interior and exterior sheets 72 and 74, and secured at periodic intervals as shown by rivets 75 or other suitable fasteners to maintain alignment of the individual layers.

Various alternative materials and techniques may be employed in the fabrication of the heating elements 40, and 150 as shown in FIGS. 5C to 5G. For example, in FIGS. 5C and 5D the wrap-around heating element 40 as described above is enclosed in a metallic sheath, indicated generally at 120. Sheath 120 is comprised of inner and outer layers 122, 124 respectively of light gauge sheet metal such as aluminum or galvanized steel, or a combination thereof, which is folded about the heating element 40 (FIG. 5D) to form a protective enclosure.

Figure 5E:
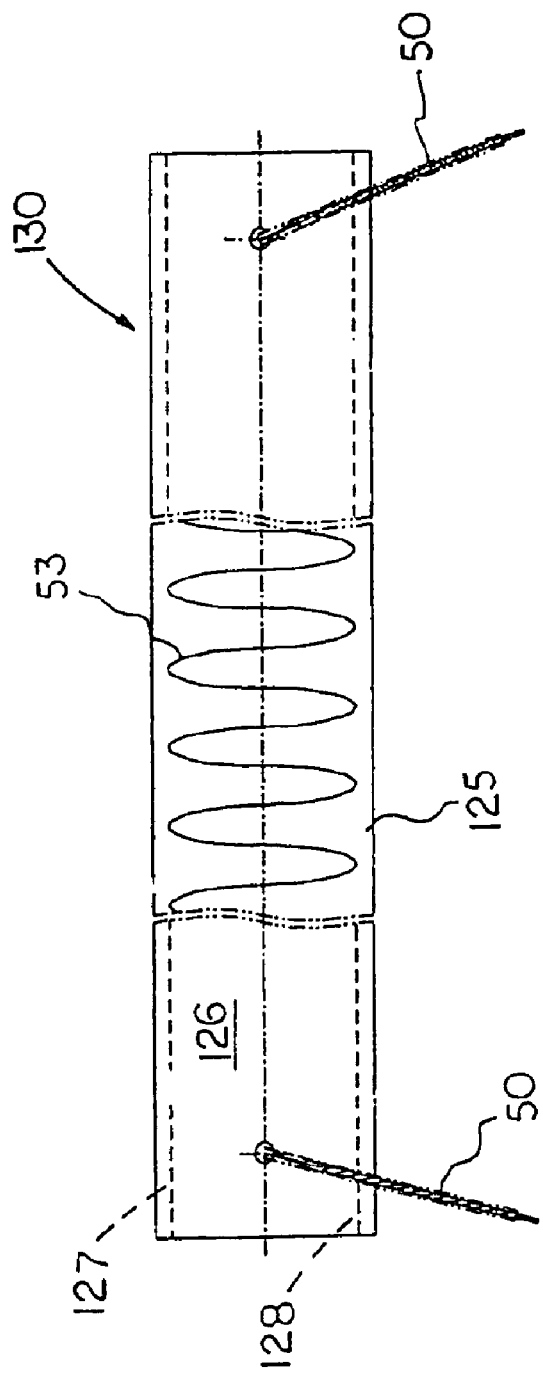
FIG. 5E is a partially cutaway elevational view of another embodiment of the wrap-around heating element.

In another embodiment shown in FIG. 5E the heater wire 53 is provided in a serpentine pattern and permanently captured between opposed layers 125, 126 of a matted fiberglass sheath, indicated generally at 130, having exceptional chemical characteristics for heat resistance. Layers 125, 126 are sewn together along suture lines 127, 128 to form the protective sheath 130 about the heater wire 53.

Figure 5F:
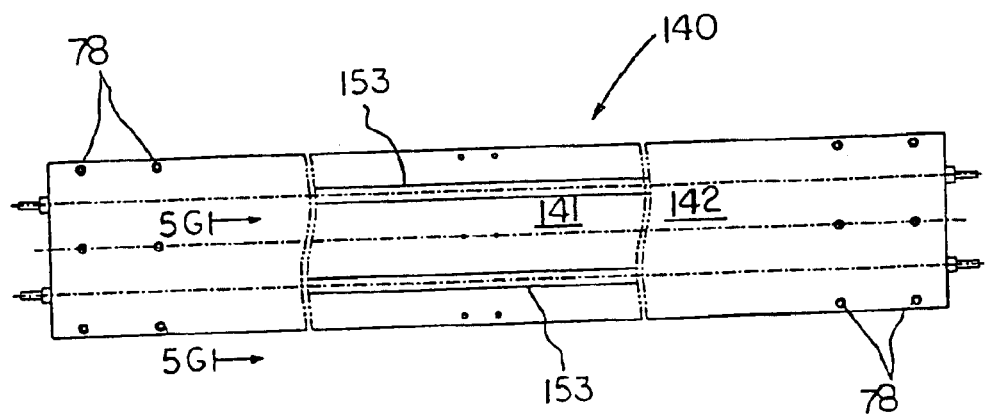
FIG. 5F is a partially cutaway elevational view of yet another embodiment of the wrap-around heating element.
Figure 5G:
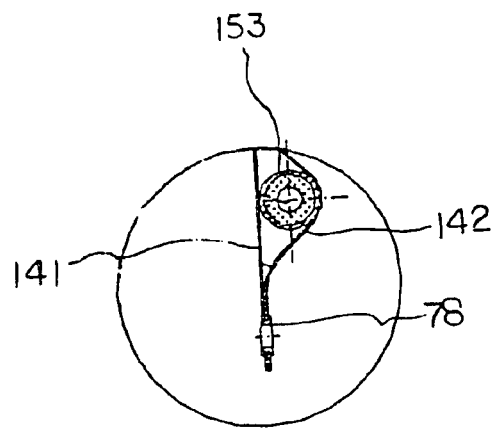
FIG. 5G is a sectional view taken along line 5G—5G of FIG. 5F showing details thereof.

In yet another embodiment shown in FIGS. 5F and 5G, a pair of resistance heating wires 53 are disposed between the opposed layers 141, 142 respectively of a metallic sheath, indicated generally at 140. In this embodiment the opposed layers 141, 142 are fabricated from aluminum sheet material and the heating wires 53 are secured in position by installation of parallel rows of rivets 75 or grommets 78 as shown.

Figure 6A:
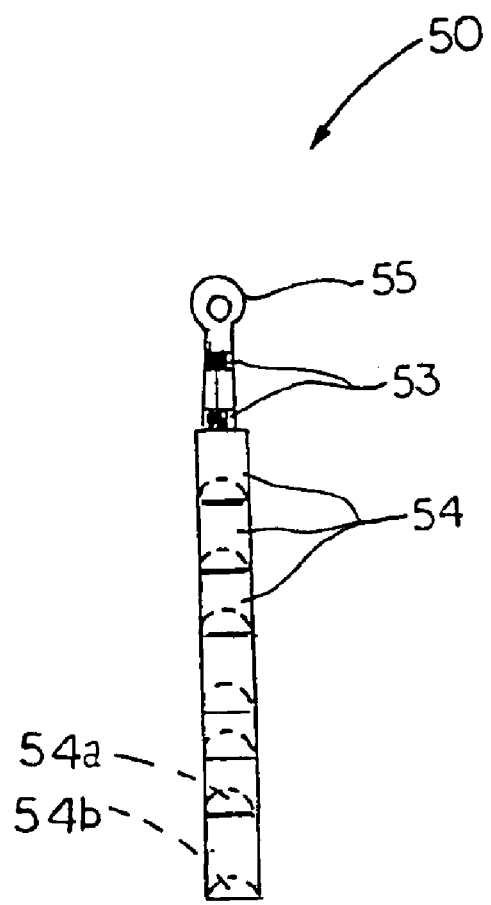
FIG. 6A is a plan view of the wire lead assembly of the heating element of the present invention.

Referring now to FIG. 6A there is shown therein a heater lead wire assembly, indicated generally at 50, for installation on the terminal ends of the heater wire 53. In this embodiment the terminal ends of the heater wire 53 are insulated by a plurality of ceramic sleeves 54 to shield the controller 32 from exposure to heat from the wire 53. It can be seen that each ceramic sleeve 54 includes a convex tip 54*a* (shown in broken lines) which engages a concave end 54*b* on the adjacent sleeve to impart flexibility to the wire lead assembly. A terminal loop connector 55 is applied to the end of each heater lead wire assembly 50 as illustrated.

Figure 6B:
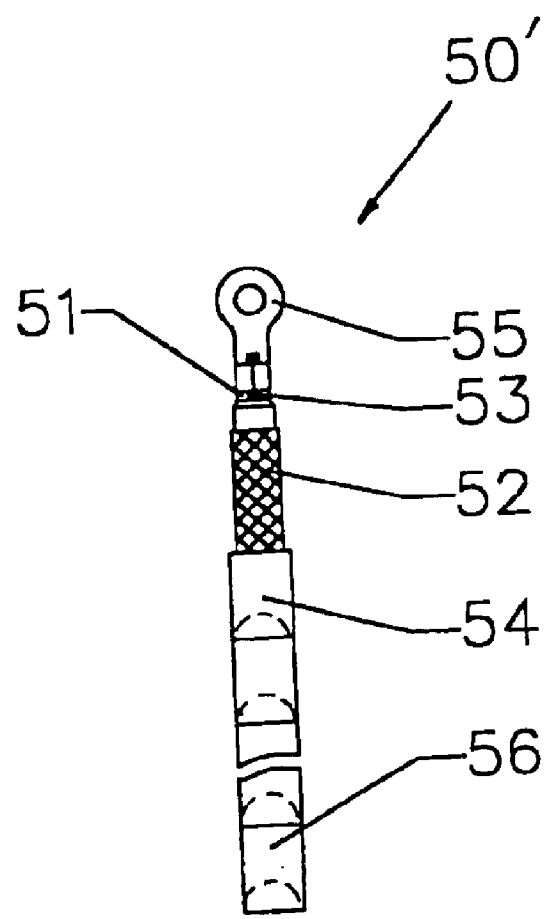
FIG. 6B is a plan view of an alternative embodiment of the wire lead assembly.

In an alternative construction of the heater lead wire assembly, indicated generally at 50', in FIG. 6B the terminal ends of the heater wire 53 are combined with a bundle of nickel conductors 51 or other suitable conductors to create a heat sink, which effectively insulates the heater wire 53 from the controller 32. Further, the bundle of nickel conductors 51 and heater wire 53 is covered with a fiberglass insulation sleeve 52 and insulated by the same ceramic sleeves 54 to insure that the temperature controls are accurate and not influenced by their proximity to the wrap-around heater element 40. A terminal loop connector 55 is applied to the terminal end of the heater lead wire assembly 50' as described hereinabove.

Figure 7A:
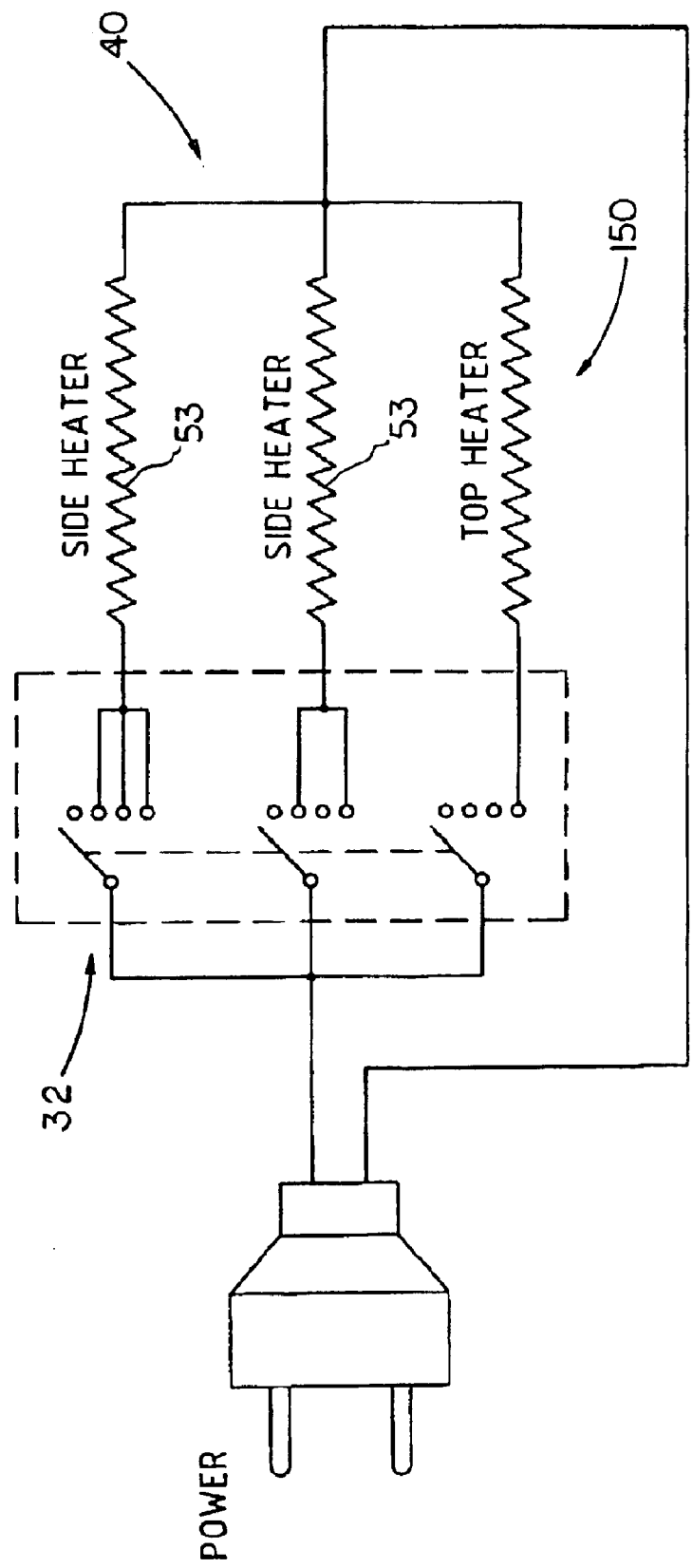
FIG. 7A is a schematic diagram representing the electromechanical controller and circuitry of the present slow cooker.
Figure 7B:
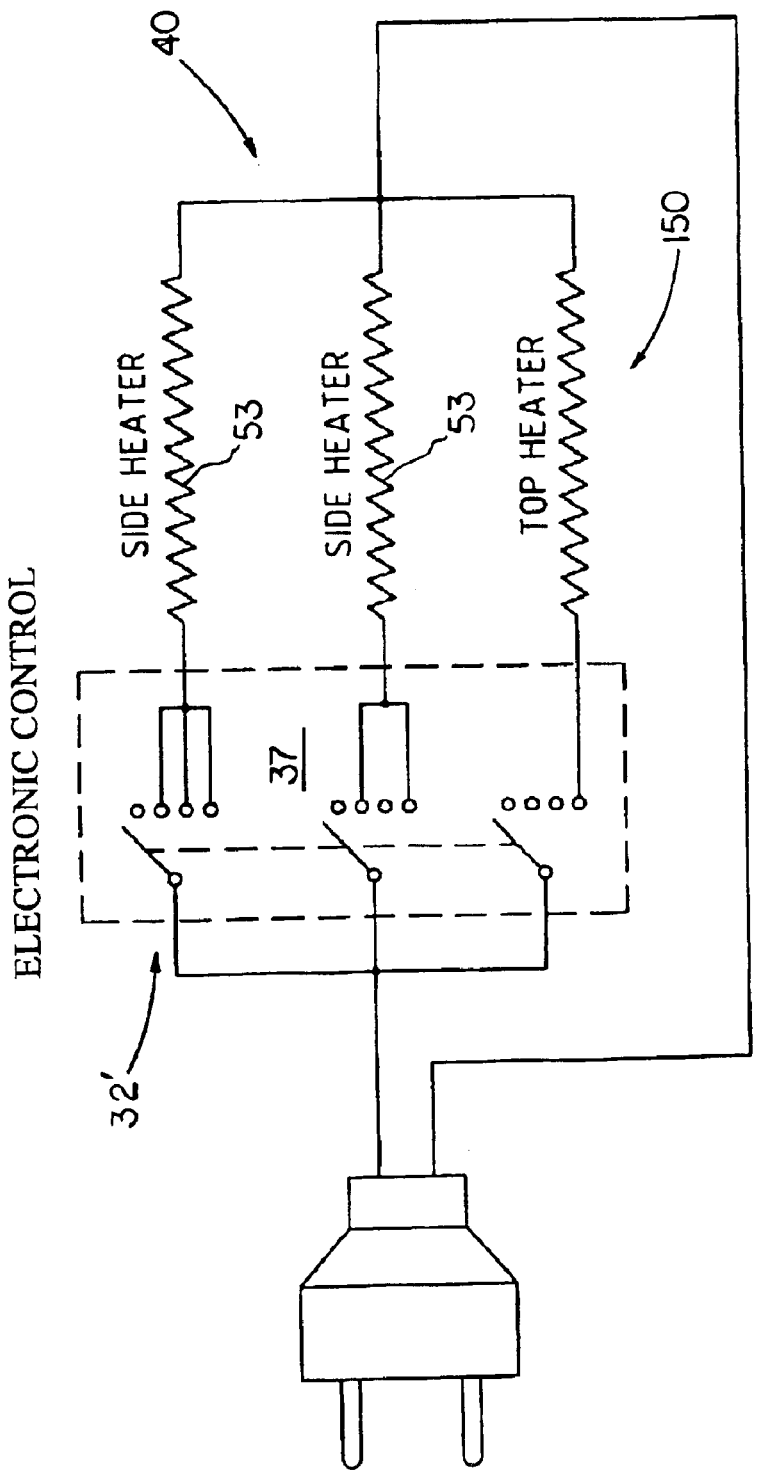
FIG. 7B is a schematic diagram representing the electronic controller and circuitry of the present slow cooker.

Referring now to FIG. 7 there is shown therein a schematic representation of the controller 32, heating elements 40, 150 and circuitry. The slow cooker 10 is designed for use with standard 120 volt electrical systems.

In the embodiment shown in FIG. 7, the controller 32 includes a multiple position switch with operating positions corresponding to OFF, COOK (both wire elements 53 activated), WARM (one wire element 53 activated), and COOK & TOP BROWNER. The wrap-around heating element 40 which is comprised of two heating wires 53 is designed to operate in the range of 100–400 watts and the top heating element 150 to operate in the range of 25–150 watts. Of course these wattage ratings may vary for a given application and capacity of the slow cooker 10.

As shown in FIG. 8A the present invention the lid 28 is provided with structures that comprise electrically conductive attaching means including, but not limited to, the following structures. A tubular resistance heating element 152 such as the type sold under the tradename Calrod® or another similar heating element is mounted on the inner surface 28*a* of the lid 28 as shown. In this embodiment the lid 28 is fabricated from a heatproof glass material. The browning element 150 extends through the lid 28 within an insulating block 154 and terminates in a plug connector 155. Plug connector 155 is received in an electrical receptacle 157 that is integrated into the hinge mechanism, indicated generally at 100, which pivots about the hinge pin 101 in the hinge body 102. In the arrangement shown the top browning element 150 is electrically connected to the power source via power cord 104 within the housing 22. Advantageously, the plug 155 and receptacle 157 may be easily disconnected for food service, cleaning, and storage purposes.

Figure 8B:
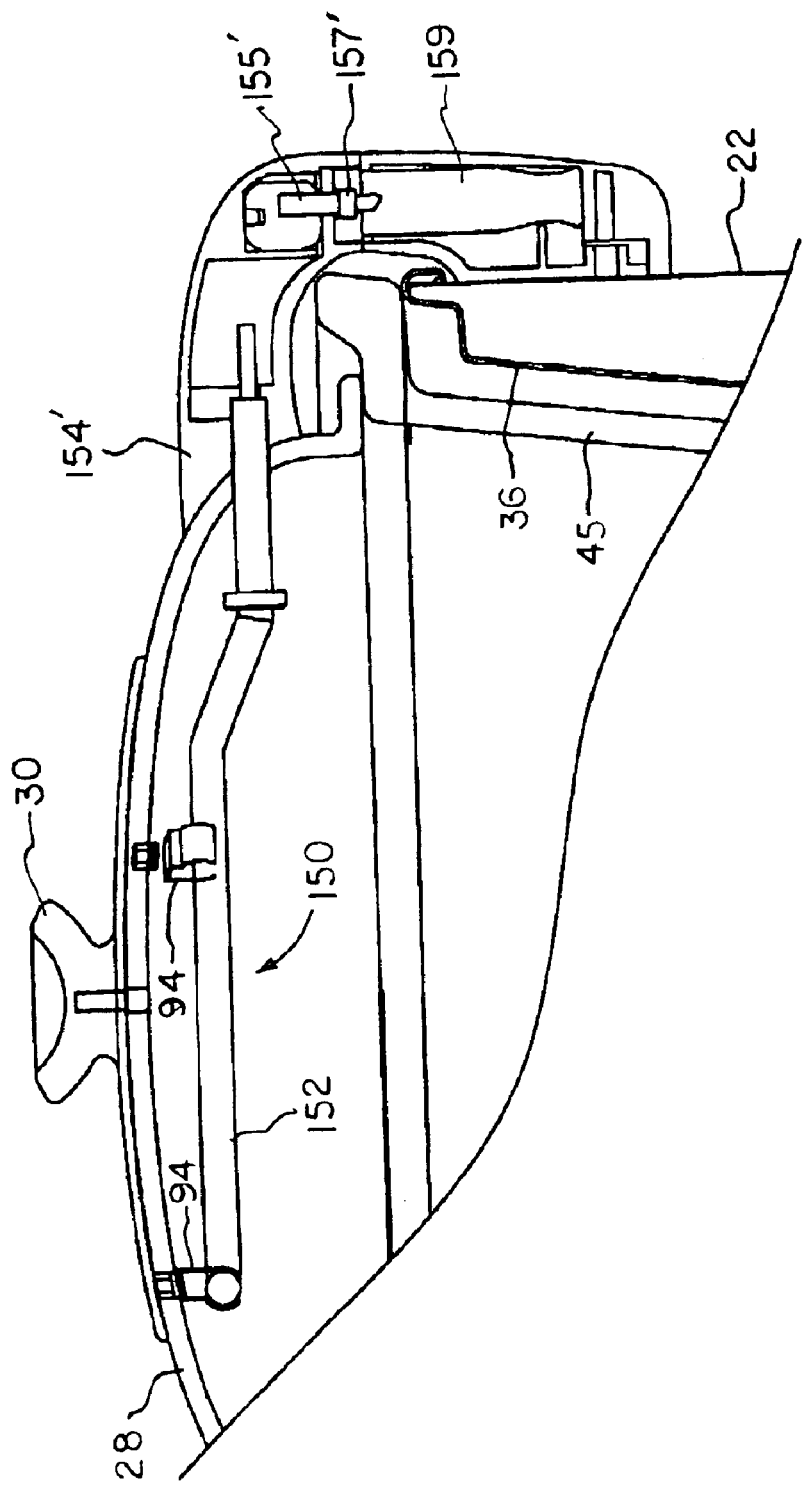
FIG. 8B is a partial cross-section view showing an alternative embodiment of the lid assembly including detachable magnetic connectors.

In another embodiment shown in FIG. 8B a resistance heating element 150 such as a Calrod® type element extends through the lid 28 within a modified insulating block 154' and terminates in a right angle plug connector 155'.

Plug connector 155' is received in an electrical receptacle 157', which includes a permanent magnet block 159. Magnet block 159 engages and retains plug connector 155' at the interface thereof to maintain electrical contact with the top browning element 150 and to secure the lid 28 in position on the slow cooker. The plug connector 155' and receptacle 157' may be conveniently disconnected to remove the lid 28 for food service, cleaning, and storage purposes.

The top heating element 150 is installed in spaced apart relation to the inner surface 28*a* of the lid 28 by the use of mounting brackets 94 which project downwardly from the lid 28 into the cooking vessel.

In an assembly procedure of the present slow cooker 10, the wrap-around heating element 40 is secured to an outer surface of the heating well 36 by use of a spring clamp 83 as shown in FIG. 4. The spring clamp 83 is constructed of spring steel and may includes a turnbuckle mechanism, which is capable of securing the heating element 40 about the outer periphery of the heating well 36. In an alternative embodiment the wrap-around heating element 40 is mounted onto studs 77 (FIGS. 5A and 5B) projecting from the heating liner 36.

A plurality of elongated slots 79 (FIGS. 5A and 5B) are formed in the terminal ends of the wrap-around heater element 40 so as to be positioned in alignment with studs 77. Studs 77 engage the elongated slots 79 during assembly and provide for slight differences in length and sliding movement between the interior and exterior insulation boards 72 and 74 and the sheet 70 during assembly.

Referring to FIG. 9 there is shown therein a comparison of cooking test results for a commercially available Crock Pot® (Item #1—without the top browning element) versus the present slow cooker 10 (Item #2—with top browning element 150). With all test parameters being substantially identical, the results clearly demonstrate that the use of the wrap-around heating element 40 in combination with the top browning element 150 over a typical cooking cycle produces a food product (i.e. chicken) having more appealing characteristics to the consumer.

In summary, the present invention has been developed to provide a slow cooker that includes a wrap-around heating element which is disposed about the heating well for heating the sidewalls thereof and a top heating element for browning.

The wrap-around heating elements are provided in different configurations to facilitate manufacturing and heating. Both the wrap-around heating element 40 and the top browning element are electrically interconnected to a heat controller for selectively energizing the heating elements. The present slow cooker includes a detachable lid member having a top browning element featuring quick connect/disconnect electrical connectors that permit removal of the lid to enhance food service and cleaning.

Although not specifically illustrated in the drawings, it should be understood that additional equipment and structural components will be provided as necessary, and that all of the components described above are arranged and supported in an appropriate fashion to form a complete and operative slow cooker incorporating features of the present invention.

Moreover, although illustrative embodiments of the invention have been described, a latitude of modification, change, and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. A slow cooker comprising:

an outer housing having a bottom surface with integrally formed side walls and an open top, a lid assembly disposed in covering relation to said open top, said lid assembly including electrically conductive attaching means comprising a hinge mechanism wherein an electrical circuit is integrated, said hinge mechanism attaching said lid assembly to said housing;

a heating well residing within said housing, said heating well having a bottom surface with integrally formed sidewalls and an open top;

a cooking liner residing within said heating well;

heating means including a top heating element disposed in said lid assembly, said top heating element being electrically connected to a power source by a quick connect/disconnect pin connector attached by electrical wiring to an electrical plug assembly within said hinge mechanism and a wrap-around heating element disposed about the side walls of said heating well and positioned intermediate said housing and said heating well; and function controlling means electrically interconnected with said heating means enabling said beating elements to be selectively energized to provide variable cooking modes.

2. The slow cooker of claim 1 wherein said lid assembly is detachable from said housing by manual disconnection of said pin connector for food service and cleaning.

3. The slow cooker of claim 1 wherein said wrap-around heating element is formed by wrapping an electrical heating wire about an insulation board material having a plurality of notches formed in the lateral edges thereof at periodic intervals such that said heating wire can be engaged within said notches in a repeating pattern.

4. The slow cooker of claim 3 wherein said heating wire is alternately traversed across said insulating board material between diagonally opposed pairs of said notches and then interlaced between adjacent pairs of said notches in a predetermined pattern such that at least 75% of said heating wire is disposed on a first side of said insulating material.

5. The slow cooker of claim 3 wherein said heating wire is wrapped in continuous revolutions about said insulating material between diagonally opposed pairs of said notches to produce said repeating pattern.

6. A slow cooker comprising:

an outer housing having a bottom surface with integrally formed side walls and an open top, a lid assembly disposed in covering relation to said open top, said lid assembly including electrically conductive attaching means comprising a plug connector for engagement with an electrical receptacle having a permanent magnet integrated therein, said magnet retaining said plug connector within said receptacle and securing said lid assembly to said housing;

a heating well residing within said housing, said heating well having a bottom surface with integrally formed sidewalls and an open top;

a cooking liner residing within said heating well;

heating means including a top heating element disposed in said lid assembly, said top heating element being electrically connected to a power source via said electrically conductive attaching means and a wrap-around heating element disposed about the side walls of said heating well and positioned intermediate said housing and said heating well; and function controlling means electrically interconnected with said heating means enabling said heating elements to be selectively energized to provide variable cooking modes.

7. The slow cooker of claim 6 wherein said wrap-around heating element is formed by wrapping an electrical heating wire about an insulating board material having a plurality of notches formed in the lateral edges thereof at periodic intervals such that said heating wire can be engaged within said notches in a repeating pattern.

8. The slow cooker of claim 7 wherein said heating wire is alternately traversed across said insulating board material between diagonally opposed pairs of said notches and then interlaced between adjacent pairs of said notches in a predetermined pattern such that at least 75% of said heating wire is disposed on a first side said insulating material.

9. The slow cooker of claim 7 wherein said heating wire is wrapped in continuous revolutions about said insulating material between diagonally opposed pairs of said notches to produce said repeating pattern.

10. The slow cooker of claim 3 wherein said top heating clement is a tubular resistance heating element.

11. The slow cooker of claim 1 wherein said function controlling means includes an electromechanical controller.

12. The slow cooker of claim 1 wherein said function controlling means includes an electronic controller.

13. A slow cooker comprising:

an outer housing having a bottom surface with integrally formed sidewalls and an open top, a lid assembly disposed in covering relation to said open top, said lid assembly including electrically conductive attaching means comprising a hinge mechanism wherein an electrical circuit is integrated, said hinge mechanism attaching said lid assembly to said housing;

a heating well residing within said housing, said heating well having a bottom surface with integrally formed sidewalls and an open top;

a cooking liner residing within said heating well;

heating means including a top heating element disposed in said lid assembly, said top heating element being electrically collected to a power source by a quick connect/disconnect pin connector attached by electrical wiring to an electrical plug assembly within said hinge mechanism and a side heating element including a plurality of resistance heating wires positioned intermediate said housing and said heating well; and function controlling means electrically interconnected to said top heating element and said plurality of resistance heating wires enabling said top heating element and said heating wires to be selectively energized to provide variable cooking modes.

14. The slow cooker of claim 13 wherein said lid assembly is detachable from said housing by manual disconnection of said pin connector for food service and cleaning.

15. The slow cooker of claim 13 wherein said side heating element is formed by capturing said plurality of heating wires between opposed layers of a metallic material.

16. The slow cooker of claim 15 wherein said heating wires are encased within stainless steel tubing.

17. The slow cooker of claim 13 wherein said side heating element is formed by capturing said plurality of heating wires between opposed layers of a heat resistant fiberglass material.

18. The slow cooker of claim 13 wherein said top heating element is a tubular resistance type heating element.

19. The slow cooker of claim 13 wherein said cooking liner is fabricated from a heatproof ceramic material.

20. The slow cooker of claim 13 wherein said cooking liner is fabricated from a heatproof glass material.

21. The slow cooker of claim 13 wherein said function controlling means includes an electromechanical controller.

22. The slow cooker of claim 13 wherein said function controlling means includes an electronic controller.

23. A slow cooker comprising:
   an outer housing having a bottom surface with integrally formed side walls and an open top,
   a lid assembly disposed in covering relation to said open top, said lid assembly including electrically conductive attaching means comprising a plug connector for engagement with an electrical receptacle having a permanent magnet integrated therein, said magnet retaining said plug connector within said receptacle and securing said lid assembly to said housing;
   a heating well residing within said housing, said heating well having a bottom surface with integrally formed sidewalls and an open top;
   a cooking liner residing within said heating well;
   heating means including a top heating element disposed in said lid assembly, said top heating element being electrically connected to a power source via said electrically conductive attaching means and a side heating element including a plurality of resistance heating wires positioned intermediate said housing and said heating well; and
   function controlling means electrically interconnected with said heating means enabling said heating elements to be selectively energized to provide variable cooking modes.

24. The slow cooker of claim 23 wherein said side heating element is formed by capturing said plurality of heating wires between opposed layers of a metallic material.

25. The slow cooker of claim 24 wherein said heating wires are encased within stainless steel tubing.

26. The slow cooker of claim 23 wherein said side heating element is formed by capturing said plurality of heating wires between opposed layers of a heat resistant fiberglass material.

27. The slow cooker of claim 23 wherein said top heating element is a tubular resistance type heating element.

28. The slow cooker of claim 23 wherein said cooking liner is fabricated from a heatproof ceramic material.

29. The slow cooker of claim 23 wherein said cooking liner is fabricated from a heatproof glass material.

30. The slow cooker of claim 23 wherein said function controlling means includes an electromechanical controller.

31. The slow cooker of claim 23 wherein said function controlling means includes an electronic controller.

* * * * *